(12) United States Patent
Klein et al.

(10) Patent No.: US 6,991,837 B2
(45) Date of Patent: *Jan. 31, 2006

(54) POLYESTER FILM HAVING IMPROVED OXYGEN BARRIER, COMPRISING POLY(M-XYLENEADIPAMIDE) AND A BARRIER COATING, PROCESS FOR ITS PRODUCTION AND ITS USE

(75) Inventors: Oliver Klein, Mainz (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 18 days.

This patent is subject to a terminal disclaimer.

(21) Appl. No.: 10/760,987

(22) Filed: Jan. 20, 2004

(65) Prior Publication Data

US 2004/0146727 A1 Jul. 29, 2004

(30) Foreign Application Priority Data

Jan. 21, 2003 (DE) .............................. 103 02 036

(51) Int. Cl.
*B32B 27/08* (2006.01)
*B32B 27/30* (2006.01)
*B32B 27/34* (2006.01)
*B32B 27/36* (2006.01)
*B32B 31/30* (2006.01)

(52) U.S. Cl. .............. 428/36.6; 428/141; 428/474.4; 428/475.2; 428/475.5; 428/475.8; 428/476.3; 428/480; 428/483; 428/910; 525/56; 525/57; 525/60; 525/221; 264/288.4; 264/289.3; 264/290.2; 264/289.6; 427/384; 427/385.5; 427/393.5

(58) Field of Classification Search ............... 428/36.6, 428/141, 474.4, 475.2, 475.5, 475.8, 476.3, 428/480, 483, 910; 525/56, 57, 60, 221; 264/288.4, 289.3, 289.6, 290.2; 427/384, 427/385.5, 393.5
See application file for complete search history.

(56) References Cited

U.S. PATENT DOCUMENTS

| | | | | |
|---|---|---|---|---|
| 3,154,461 A | | 10/1964 | Johnson ...................... 161/116 |
| 5,021,515 A | * | 6/1991 | Cochran et al. ............. 525/371 |
| 5,552,479 A | * | 9/1996 | Tanaka et al. ................ 525/57 |
| 5,560,988 A | * | 10/1996 | Oba et al. .................... 428/389 |
| 5,574,096 A | * | 11/1996 | Tanaka et al. ................ 525/57 |
| 5,658,676 A | * | 8/1997 | Prissette et al. ............. 428/483 |

(Continued)

FOREIGN PATENT DOCUMENTS

DE 2 353 347 10/1972

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

*Primary Examiner*—Vivian Chen
(74) *Attorney, Agent, or Firm*—ProPat, L.L.C.

(57) ABSTRACT

Biaxially oriented polyester films which have a polyester-containing base layer (B) which additionally comprises poly(m-xyleneadipamide) and which is coated on at least one side with a barrier layer (D), the barrier layer comprising polyvinyl alcohol and a copolymer of maleic acid and acrylic acid, feature improved optical properties such as high gloss and low opacity, and very good barrier properties, in particular with respect to oxygen passage, and are also suitable as packaging materials for foods or other consumable items as a consequence of their insensitivity toward moisture.

16 Claims, 1 Drawing Sheet

U.S. PATENT DOCUMENTS

| | | | |
|---|---|---|---|
| 5,716,715 A * | 2/1998 | Degrassi et al. | 428/475.8 |
| 5,773,092 A * | 6/1998 | Prissette et al. | 427/385.5 |
| 6,177,159 B1 * | 1/2001 | Tajiri et al. | 428/35.7 |
| 6,288,161 B1 * | 9/2001 | Kim et al. | 524/538 |
| 6,506,463 B1 * | 1/2003 | Cahill et al. | 428/35.7 |
| 6,509,436 B1 * | 1/2003 | Cahill et al. | 528/277 |
| 6,562,276 B1 * | 5/2003 | Shelby et al. | 264/328.8 |
| 6,709,735 B2 * | 3/2004 | Posey et al. | 428/215 |
| 2002/0164442 A1 * | 11/2002 | Hirota et al. | 428/35.7 |
| 2003/0039779 A1 * | 2/2003 | Share et al. | 428/35.7 |
| 2003/0124365 A1 * | 7/2003 | Posey et al. | 428/480 |
| 2004/0146718 A1 * | 7/2004 | Konrad et al. | 428/424.4 |
| 2004/0146725 A1 * | 7/2004 | Konrad et al. | 428/475.2 |
| 2004/0146750 A1 * | 7/2004 | Klein et al. | 428/694 SG |

FOREIGN PATENT DOCUMENTS

| | | |
|---|---|---|
| EP | 0 053 498 A2 | 6/1982 |
| EP | 0 347 646 A2 | 12/1989 |
| EP | 0 602 964 A1 | 6/1994 |
| EP | 0 675 158 B1 | 10/1995 |
| EP | 1 197 328 A2 | 8/2002 |
| EP | 1 234 848 A1 | 8/2002 |
| JP | XP002276539 A | 11/1983 |
| JP | XP002276645 A | 3/1994 |
| JP | 2001-347592 A | 12/2001 |
| WO | WO 99/62694 A1 | 12/1999 |
| WO | WO 01/92011 A1 | 12/2001 |
| WO | WO 02/38673 A2 | 5/2002 |
| WO | WO 03/041955 * | 5/2003 |

* cited by examiner

POLYESTER FILM HAVING IMPROVED OXYGEN BARRIER, COMPRISING POLY(M-XYLENEADIPAMIDE) AND A BARRIER COATING, PROCESS FOR ITS PRODUCTION AND ITS USE

FIELD OF THE INVENTION

The invention relates to a transparent, biaxially oriented polyester film having a base layer (B). In addition to polyester, the base layer (B) comprises, as an additional polymer, poly(m-xyleneadipamide) (MXD6). It is coated on at least one side with a barrier layer (D) which consists of a blend which comprises polyvinyl alcohol and a copolymer of maleic acid and acrylic acid. The invention further relates to a process for producing the film and to its use.

BACKGROUND OF THE INVENTION

Transparent, biaxially oriented polyester films which feature improved barrier properties are disclosed by the prior art. In most cases, the films obtain their improved barrier properties offline after the production by a further processing step. Examples thereof are extrusion coating, coating or lamination with barrier materials, coating under reduced pressure with metals or with ceramic substances, or plasma polymerization in conjunction with vacuum coating.

An exception from this is the process described in detail in WO 99/62694, in which a multilayer, coextruded polyester film which comprises at least one layer of EVOH (ethylene-vinyl alcohol) is simultaneously biaxially stretched. The film features good mechanical properties, but in particular good barrier properties against the passage of oxygen. The best value specified in the document for the achievable oxygen transmission rate (OTR) is 5 cm$^3$/(m$^2$·bar·d). A disadvantage of the process is that regrind obtained in the course of the production cannot be fed back to the process, without the film losing its good optical properties.

A further exception is the biaxially oriented film which is described in JP 2001-347592 and consists of a mixture of polyethylene terephthalate and poly(m-xyleneadipamide) (MXD6). The proportion of poly(m-xyleneadipamide) (MXD6) in the film is between 10 and 40% by weight, and the corresponding fraction of polyethylene terephthalate is between 60 and 90% by weight. The film is simultaneously biaxially stretched. It features good mechanical properties, high thermal stability, but in particular a good barrier with regard to the permeation of oxygen. The film achieves an OTR which is less than 30 cm$^3$/(m$^2$·bar·d). In addition, the film features low opacity. The document specifies a value for the opacity which is below 15%. A disadvantage of the film is its two rough surfaces which result from the mixing incompatibility of the two raw materials and the simultaneous biaxial stretching. As a result, the film loses its gloss and obtains a matt appearance which is undesired for many applications in the packaging industry. A further disadvantage is that the film cannot as efficiently be printed, metallized or coated as films which consist, for example, only of polyethylene terephthalate. The high roughness of the two film surfaces makes the thickness distribution of additionally applied layers (printing inks, metals, varnish, ceramic materials) inadequate. As a result, the physical properties of these layers likewise worsen.

Likewise an exception is the film of EP-A-0 675 158 B1 which is an oriented composite film based on polyester and having improved barrier properties with respect to gases. The film is coated on at least one of the two sides with a layer, which has a thickness of 0.3 μm or less, of polyvinyl alcohol which has a number-average degree of polymerization of 350 and more, and the average roughness R$_z$ of the coated side of the base film is 0.30 μm or less and this side features a certain distribution of the elevations on the film surface. The composite film has an OTR which is less than 3 cm$^3$/(m$^2$·bar·d). A disadvantage of this composite film is its low resistance, for example, toward moisture. On contact with water or steam, the adhesion of the barrier layer of polyvinyl alcohol to the polyester film is lost, with the effect that the barrier coating can be washed off the polyester film.

SUMMARY OF THE INVENTION

It is an object of the present invention to provide a biaxially oriented polyester film which features very good barrier properties, in particular toward the passage of oxygen. The film should no longer have the disadvantages of the prior art films and should in particular have the following features:

good printability, good metallizability and good coatability, without impairing the action of this additional functional layer;

high gloss;

economically viable producibility, also meaning, for example, that the film can be produced using the (generally sequential) stretching processes which are customary in industry, without being restricted to the expensive simultaneous stretching process;

the guarantee in the production of the film that the regrind can be fed back to the extrusion in an amount of up to 60% by weight, without the physical and optical properties of the film, but in particular the barrier toward oxygen, being significantly adversely affected.

On the other hand, the other properties which are features of polyester films should at the same time not worsen. These include, for example, the mechanical and the thermal properties, the winding behavior and the processability of the film, in particular in the printing, laminating or the coating with metallic or ceramic materials.

DETAILED DESCRIPTION OF THE INVENTION

This object is achieved by a biaxially oriented polyester film which has a base layer (B), at least one side of which has been coated with a barrier layer (D), wherein the base layer (B) comprises poly(m-xyleneadipamide) (MXD6) and the barrier layer (D) is composed of a blend in which a film-forming substance and a copolymer of maleic acid and acrylic acid are present.

The base layer (B) also comprises thermoplastic polyester, preferably at least 60% thereof, based on the weight of the layer (B). A proportion of poly(m-xyleneadipamide) in the base layer is preferably from 5 to 30% by weight, based on the weight of the layer (B). The film-forming substance is preferably polyvinyl alcohol.

Poly(m-xyleneadipamide) (MXD6), also referred to as poly-m-xylyleneadipamide or PA-MXD6, is a polycondensation product (polyarylamide) of m-xylylenediamine and adipic acid and is offered on the market in various types which are all suitable in principle for the inventive purpose. Preference is given to types having a melt viscosity of less than 2000 poises.

The biaxially oriented, transparent polyester film of the present invention, compared to prior art films, has improved optical properties, in particular increased gloss. In addition, the film features outstanding barrier properties, in particular toward the passage of oxygen. A minimum adhesion between the film and the barrier coating of greater than 0.5 N/25 mm is ensured, even after contact with moisture.

The film has an OTR of preferably less 30 cm$^3$/(m$^2$·d·bar), preferably less than 25 cm$^3$/(m$^2$·d·bar) and more preferably less than 20 cm$^3$/(m$^2$·d·bar).

Figure 1:
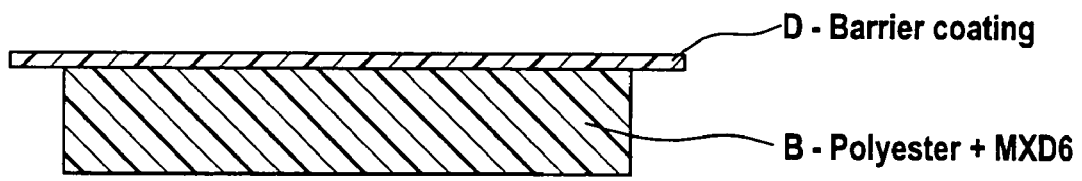
FIG. 1 is a cross-sectional schematic illustration of exemplary embodiments of films in accordance with the invention.
Figure 2:
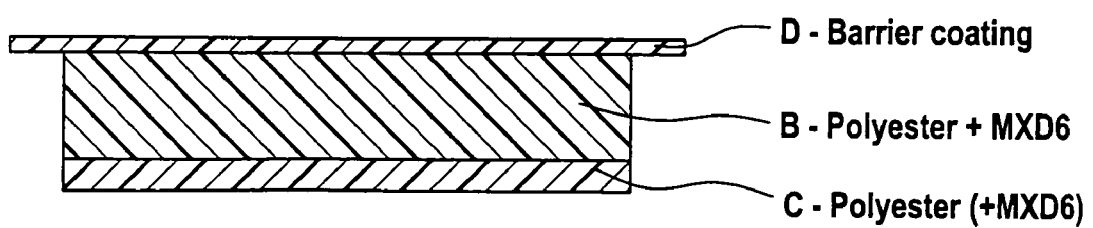
FIG. 2 is a cross-sectional schematic illustration of further exemplary embodiments of films in accordance with the invention.

The film of the present invention preferably consists of the inventive base layer (B) and the inventive coating (D). In this case, the film has a two-layer structure (cf. FIG. 1). In another inventive embodiment, the film has a three-layer structure (cf. FIG. 2). In that case, it consists of the inventive base layer (B), the inventive barrier layer (D) applied to one side of the base layer (B), and also an overlayer (C) applied to the other side of the base layer (B). The layers D and C may be same or different.

The base layer of the film preferably consists of at least 60% by weight of thermoplastic polyester (=component I). Suitable for this purpose are, for example, polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly-1,4-cyclohexanedimethylene terephthalate, PCDT), and also of ethylene glycol, naphthalene-2,6-dicarboxylic acid and biphenyl-4,4'-dicarboxylic acid (=polyethylene 2,6-naphthalate bibenzoate, PENBB). Preference is given to polyesters which consist of at least 90 mol %, more preferably at least 95 mol %, of ethylene glycol and terephthalic acid units, or of ethylene glycol and naphthalene-2,6-dicarboxylic acid units. The remaining monomer units stem from other diols or other dicarboxylic acids. Advantageously, copolymers or mixtures or blends of the homo- and/or copolymers mentioned may also be used for component I of the base layer (B).

It is particularly advantageous for the last-mentioned case when component I used in the base layer (B) is based on isophthalic acid and terephthalic acid or based on terephthalic acid and naphthalene-2,6-dicarboxylic acid. In this case, the producibility of the film is good and the optical properties of the film, and also the barrier properties of the film which are achieved, are particularly good.

In this case, the base layer (B) comprises substantially, as component I, a polyester copolymer which is composed predominantly of isophthalic acid and terephthalic acid units and/or terephthalic acid and naphthalene-2,6-dicarboxylic acid units and of ethylene glycol units, and, as component II, the aforementioned inventive poly(m-xyleneadipamide) (MXD6).

The preferred copolyesters which provide the desired properties of the film (in particular the optical properties, joint stretchability) are those which are composed of terephthalate and isophthalate units and of ethylene glycol units. The proportion of ethylene terephthalate in these copolymers is preferably from 40 to 97 mol % and the corresponding proportion of ethylene isophthalate is from 60 to 3 mol %. Preference is given to copolyesters in which the proportion of ethylene terephthalate is from 50 to 95 mol % and the corresponding fraction of ethylene isophthalate is from 50 to 5 mol %, and greater preference is given to copolyesters in which the proportion of ethylene terephthalate is from 60 to 90 mol % and the corresponding proportion of ethylene isophthalate is from 40 to 10 mol %.

Suitable other aliphatic diols which may be constituents of the polyesters according to the invention are, for example, diethylene glycol, triethylene glycol, aliphatic glycols of the general formula HO—(CH$_2$)$_n$—OH where n is an integer from 2 to 6 (in particular propane-1,3-diol, butane-1,4-diol, pentane-1,5-diol and hexane-1,6-diol), or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. In addition, bisphenols of the formula HO—C$_6$H$_4$—C$_6$H$_4$—OH are also very suitable.

Suitable other aromatic dicarboxylic acids which may be constituents of the polyesters according to the invention are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the (C$_3$–C$_{19}$)alkanedioic acids are particularly suitable, and the alkane moiety may be straight-chain or branched.

The polyesters may be prepared by the known transesterification process. This starts from dicarboxylic esters and diols which are reacted with the customary transesterification catalysts, such as zinc salts, calcium salts, lithium salts and manganese salts. The intermediates are then polycondensed in the presence of generally customary polycondensation catalysts such as antimony trioxide or titanium salts. The preparation may equally well be effected by the direct esterification process in the presence of polycondensation catalysts. This starts directly from the dicarboxylic acids and the diols.

According to the invention, a further component contained in the base layer (B) is poly(m-xyleneadipamide) (MXD6) (=component II) in an amount of preferably from 5 to 30% by weight, in particular in an amount of from 6 to 25% by weight and more preferably in an amount from 7 to 20% by weight, based on the weight of the base layer (B).

For the processing of the polymers, it has been found to be favorable when the poly(m-xyleneadipamide) (MXD6) is selected in such a way that there is not too great a difference in the viscosities of the particular polymer melts. Otherwise, additional elevations/projections, disruptions to flow or streak formation are under some circumstances to be expected on the finished film. Moreover, the polymers then tend to separate. In accordance with the experiments carried out here, the melt viscosity of the poly(m-xyleneadipamide) (MXD6) should preferably be below certain values. Very good results are obtained in the context of the present invention when the melt viscosity for the MXD6 is less than 2000 poises (measured in a capillary rheometer of diameter 0.1 mm, length 10 mm and load 10 kg/cm², melt temperature 280° C.), preferably less than 1800 poises and more preferably less than 1600 poises.

The same also applies for the viscosity of the polyester used. Very good results in the context of the present invention are obtained when the melt viscosity for the polyester is less than 2000 poises (measured in a capillary rheometer of diameter 0.1 mm, length 10 mm and load of 10 kg/cm², melt temperature 280° C.), preferably less than 1800 poises and more preferably less than 1600 poises.

According to the invention, to achieve good melt homogeneity and to achieve good stretchability, the viscosities of the starting polymers should not differ by more than 30% (viewed in absolute terms), based on the melt viscosity of the polyester used.

The poly(m-xyleneadipamide) (MXD6) is appropriately incorporated into the film either as pure granules or as a granulated concentrate (masterbatch). To this end, the polyester granules are premixed with the poly(m-xyleneadipamide) (MXD6) or the poly(m-xyleneadipamide) (MXD6) masterbatch and subsequently fed to the extruder. In the extruder, the components are mixed further and heated to processing temperature. It is appropriate for the process according to the invention when the extrusion temperature is above the melt temperature $T_s$ of the poly(m-xyleneadipamide (MXD6), generally at least 5° C., preferably from 10 to 50° C., but in particular from 20 to 40° C., above the melt temperature of the poly(m-xyleneadipamide) (MXD6). A preferred extrusion unit for the processing of the mixture or else for the preparation of the masterbatch from components I and II is the twin-screw extruder.

The film of the present invention has an at least two-layer structure. In that case it consists of the inventive base layer (B) and the inventive barrier coating (D) disposed on it. The film may also have additional layers, for example an overlayer (C) disposed on the other side of the base layer (B), or else also intermediate layers, for example between the base layer (B) and the overlayer (C). Typical film structures in that case are, for example, DB or DBC or DBZC where (Z) is an intermediate layer and (C) is an overlayer. A DBD film structure is also encompassed by the present invention, in which case the composition of the D layers may be the same or different.

The (polyester) polymers used for the overlayer and for the intermediate layers may in principle be the same as for the base layer B. In addition, other materials may also be present in these further layers, in which case these layers preferably consist of a mixture of polymers, copolymers or homopolymers, which contains ethylene isophthalate units and/or ethylene 2,6-naphthalate units and/or ethylene terephthalate units. Up to 10 mol % of the polymers may consist of further comonomers.

Advantageously, further components used in these further layers may also be (polyester) copolymers or (polyester) mixtures of blends of homo- and/or copolymers.

It is particularly appropriate to use a polyester copolymer based on isophthalic acid and terephthalic acid in the overlayer (C). In this case, the optical properties of the film are particularly good.

In this case, the overlayer (C) comprises substantially a polyester copolymer which is composed predominantly of isophthalic acid and terephthalic acid units and of ethylene glycol units. The remaining monomer units stem from other aliphatic, cycloaliphatic or aromatic diols or other dicarboxylic acids, as may also occur in the base layer. The preferred copolyesters which provide the desired properties of the film (in particular the optical properties) are those which are composed of terephthalate and isophthalate units and of ethylene glycol units. The proportion of ethylene terephthalate is preferably from 40 to 97 mol % and the corresponding proportion of ethylene isophthalate is from 60 to 3 mol %. Preference is given to copolyesters in which the proportion of ethylene terephthalate is from 50 to 90 mol % and the corresponding proportion of ethylene isophthalate is from 50 to 10 mol %, and greater preference is given to copolyesters in which the portion of ethylene terephthalate is from 60 to 85 mol % and the corresponding proportion of ethylene isophthalate is from 40 to 15 mol %.

In a further embodiment, a further component also contained in the overlayer (C) is poly(m-xyleneadipamide) (MXD6) (=component II) in an amount of preferably from 0 to 60% by weight, in particular in an amount from 2 to 50% by weight and more preferably in an amount from 4 to 40% by weight, based on the weight of the overlayer (C).

The thickness of the overlayer (C) is preferably greater than 0.5 µm and is preferably in the range from 1.0 to 20 µm and more preferably in the range from 1.5 to 10 µm.

The base layer (B), and also any overlayers and intermediate layers, (C) and (F, G, . . . ), may additionally comprise customary additives, for example stabilizers and antiblocking agents. They are appropriately added to the polymer or to the polymer mixture before the melting. The stabilizers used are, for example, phosphorus compounds, such as phosphoric acid or phosphoric esters. Typical antiblocking agents (also referred to in this context as pigments or fillers) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polystyrene or acrylate particles.

The additives selected may also be mixtures of two or more different antiblocking agents or mixtures of antiblocking agents of the same composition but different particle size. The particles may be added to the individual layers in the customary concentrations, for example as a glycolic dispersion during the polycondensation or via masterbatches in the course of the extrusion. Advantageous pigment concentrations have been found to be from 0.0001 to 5% by weight, based on the weight of the layer provided with them. A detailed description of antiblocking agents can be found, for example, in EP-A-0 602 964.

In a preferred embodiment of the invention, the proportion of filler in the overlayer (C) is less than 0.6% by weight, preferably less than 0.5% by weight and more preferably less than 0.4% by weight, based on the weight of the overlayer (C).

In a further, particularly preferred embodiment, the overlayer (C) contains no poly(m-xyleneadipamide) (MXD6), and also not more than 0.5% by weight of a certain filler, for example $SiO_2$, and has an average roughness $R_a$ which is in the range from 10 to 100 nm. The median diameter $d_{50}$ of the fillers used should be in the range of preferably from 2.0 to 5.0 µm. Such an overlayer (C) is then very particularly suitable for the application of further layers and coatings which may be applied, for example, inline (in the course of the production of the film) or, for example, offline (in the course of the further processing of the film) by suitable processes (for example reverse gravure, melt coating).

According to the invention, the base layer (B) is coated on one side with a barrier layer (D) which consists of a blend which comprises a film-forming substance, preferably polyvinyl alcohol, and a copolymer of maleic acid and acrylic acid. The preferred poly(maleic acid-co-acrylic acid) copolymer (PMA-co-PA) has an average molecular weight of from 1500 to 15 000, contains the individual monomer units in a ratio of approx. 50:50 and has an alternating structure. Preference is not given to conventional block copolymers. The solids content of the copolymer according to the invention in the coating is preferably from 50 to 95% by weight, in particular from 55 to 90% by weight and more preferably from 60 to 85% by weight, based on the sum of copolymer and film-forming substance.

In addition to the copolymer, the blend of the coating according to the invention comprises a film-forming substance which is preferably water-soluble. This substance essentially minimizes the brittleness of the coating. A preferred film-forming substance is polyvinyl alcohol. The solids content of the polyvinyl alcohol or of the film-forming substance in the coating is preferably from 5 to 50% by weight, in particular from 10 to 45% by weight and more preferably from 15 to 40% by weight, based on the sum of copolymer and film-forming substance. The molecular weight of the polyvinyl alcohol is preferably greater than 15 000, in particular greater than 20 000 and more preferably greater than 30 000.

In a preferred embodiment, the coating or the blend also comprises a wetting agent and/or a starch, in which case the latter should preferably be water-soluble. In addition, antimicrobiological substances, for example triclosan or methylparaben, may be added to the coating or to the blend.

A preferred coating batch (=solution or dispersion of the blend according to the invention and water) contains from 2 to 3% by weight of polyvinyl alcohol and from 7 to 8% by weight of poly(maleic acid-co-acrylic acid) copolymer. The proportion of water in this solution is from 50 to 99% by weight, preferably from 80 to 95% by weight. Percentages by weight are based here in each case on the finished dispersion/solution.

For the dispersion or for the dissolution of the solids according to the invention (blends comprising any further additives), preference is given to using water or water-containing solvents. Alternatively, the solvents used may also be alcohols or other suitable organic substances, alone or in combination with water. The solids content in the finished dispersion/solution is generally up to 50% by weight, preferably from 0.01 to 30% by weight and more preferably from 5 to 15% by weight.

A film which has been coated with the barrier layer according to the invention is outstandingly suitable for the packaging of foods, in which case contact of the coating with the food is possible. The coated film has excellent resistance toward solvents and also toward water. It has been found, for example, that a two-hour extraction of the film according to the invention in a steam atmosphere at 121° C. extracted no measurable amount of the coating.

Another significant advantage of the coating according to the invention is its ability to provide good barrier properties even at low layer thicknesses. One consequence is a reduction in the costs and another is that this improves the transparency of the film. In general, the coating thickness (D) is from 0.01 to 1 µm, preferably from 0.04 to 0.2 µm and more preferably from 0.06 to 0.15 µm.

The total thickness of the polyester film according to the invention may vary within wide limits and depends on the intended application. It is generally from 6 to 300 µm, preferably from 8 to 200 µm, more preferably from 10 to 100 µm, and the base layer (B) has a fraction of preferably from 40 to 99% of the total thickness.

The present invention also provides a process for producing the film. To produce the base layer (B), the particular components (component I=polyester homo- or polyester copolymer or mixtures thereof, component II=poly(m-xyleneadipamide) (MXD6) granules) are appropriately fed directly to the extruder. The materials can be extruded at from about 270 to 300° C. From a process technology point of view (mixing of the different polymers), it has been found to be particularly favorable when the extrusion of the polymers for the base layer (B) is carried out on a twin-screw extruder having degassing means.

The polymers for any overlayer (C) present are appropriately fed to the (coextrusion) system via a further extruder; preference is also to be given here in principle to the twin-screw extruder over the single-screw extruder. The melts are shaped in a multilayer nozzle to give flat melt films and layered one on top of the other. Subsequently, the multilayer film is drawn off and solidified with the aid of a chill roll and optionally further rolls.

The biaxial stretching is carried out sequentially. Preference is given to stretching first in longitudinal direction (i.e. in machine direction) and subsequently in transverse direction (i.e. at right angles to machine direction). The stretching in longitudinal direction can be carried out with the aid of two rolls rotating at different rates in accordance with the desired stretching ratio. For transverse stretching, an appropriate tenter frame is generally used.

The temperature at which the stretching is carried out may vary within a relatively wide range and depends upon the desired properties of the film. In general, the stretching in longitudinal direction is carried out within a temperature range of from 80 (heating temperature from 80 to 130° C.) to 130° C. (stretching temperatures 80–130° C., depending on the stretching ratio) and the transverse stretching within a temperature range of from 90 (beginning of the stretching) to 140° C. (end of the stretching). The longitudinal stretching ratio is preferably in the range from 2.0:1 to 5.0:1, in particular from 2.3:1 to 4.8:1. The transverse stretching ratio is preferably in the range from 2.5:1 to 5.0:1, in particular from 2.7:1 to 4.5:1.

Before the transverse stretching, at least one surface of the base layer (B) of the film is preferably coated inline with the barrier coating (D) according to the invention.

For the production of a film having very particularly good optical properties (=very low opacity) and having good process reliability (few tears), it has been found to be favorable when the planar orientation $\Delta p$ of the film is less than $\Delta p=0.162$, preferably less than $\Delta p=0.160$ and very preferably less than $\Delta p=0.158$. The process parameters in the longitudinal stretching and in the transverse stretching have a significant influence on the planar orientation $\Delta p$ of the finished film. The most important process parameters influencing the planar orientation include the stretching ratios in longitudinal and in transverse direction ($\lambda_{MD}$ and $\lambda_{TD}$) and the stretching temperatures in longitudinal and transverse direction ($T_{MD}$ and $T_{TD}$). When, for example, a machine is used to obtain a planar orientation of the film produced of $\Delta p=0.165$ with the parameter set $\lambda_{MD}=4.6$ and $\lambda_{TD}=4.0$ and $T_{MD}=118°$ C. and $T_{TD}=125°$ C., increasing the longitudinal stretching temperature to $T_{MD}=125°$ C. or increasing the transverse stretching temperature to $T_{TD}=135°$ C. or reducing the longitudinal stretching ratio to $\lambda_{MD}=4.3$ or reducing the transverse stretching ratio to $\lambda_{TD}=3.7$ results in a planar orientation $\Delta p$ being obtained which is within the desired range. The temperatures specified relate, in the case of the longitudinal stretching, to the particular roll temperatures, and, in the case of the transverse stretching, to the film temperatures which have been measured by means of IR.

In the subsequent heat-setting, the film is kept at a temperature of from approx. 150 to 250° C. over a period of from about 0.1 to 10 s. Subsequently, the film is wound up in a customary manner.

The gloss of the film surface (B) is preferably greater than 100 at an angle of incidence of 20°. In a preferred embodiment, the gloss of this side is more than 110 and in a particularly preferred embodiment more than 120. The high gloss of this layer (B) only slightly impairs the functional layer (D), if at all. For example, a uniform thickness distribution of the coating (D) is achieved, which results in particularly good physical properties of this layer ultimately being established.

The opacity of the film is preferably less than 20%. In a preferred embodiment, the opacity of the film is less than 15% and in a particularly preferred embodiment less than 10%. As a result of the low opacity, the film is especially suitable for application in packaging.

A further advantage of the invention is that the production costs of the film according to the invention are not significantly above those of a film of standard polyester raw materials. In addition, it is guaranteed in the course of the production of the film that offcut material, which occurs inherently in the operation of film production, can be reused for the film production as regrind in an amount of up to approx. 60% by weight, preferably from 10 to 50% by weight, based in each case on the total weight of the film, without the physical properties of the film being significantly adversely affected.

The film according to the invention is additionally outstandingly suitable for metallizing or vacuum-coating with ceramic substances. Preference is given here to metallizing the film or coating the film with ceramic substances on the side which has been coated with the coating according to the invention. It is then notable very particularly for outstanding barrier properties, not only toward oxygen but also toward steam.

The film according to the invention is therefore especially suitable for packaging foods or other consumable items. The film features outstanding barrier properties, in particular toward oxygen. In addition, it is resistant toward contact with moisture. The barrier layer (D) cannot, for example, be washed off, in comparison to prior art barrier layers.

The table which follows (Table 1) once again summarizes the most important inventive and preferred film properties, and "inventive" is to be regarded as a preferred embodiment.

TABLE 1

|  | Inventive | Preferred | More preferred | Unit | Test Method |
|---|---|---|---|---|---|
| Base Layer B |  |  |  |  |  |
| Component I (= thermoplastic polyester) | 60 to 95 | 65 to 94 | 70 to 93 | % by weight |  |
| Component II (= poly(m-xyleneadipamide) (MXD6) | 5 to 30 | 6 to 25 | 7 to 20 | % by weight |  |
| Melt viscosity of the poly(m-xyleneadipamide) (MXD6) used | <2000 | <1800 | <1600 | poise | in a capillary rheometer, 280° C. |
| Barrier Coating (D) |  |  |  |  |  |
| Polyvinyl alcohol (solids content based on PVOH + copolymer) | 5 to 50 | 10 to 45 | 15 to 40 | % by weight |  |
| Poly(maleic acid-coacrylic acid) copolymer (solids content based on PVOH + copolymer) | 50 to 95 | 55 to 90 | 60 to 85 | % by weight |  |
| Thickness of the layer (D) | 0.01 to 1 | 0.04 to 0.2 | 0.06 to 0.15 | $\mu$m |  |
| Film Properties |  |  |  |  |  |
| Permeation coefficient for oxygen | <30 | <25 | <20 | $cm^3 * [12 \mu m]/(m^2 \cdot bar \cdot d)$ | DIN 53 380, Part 3 |
| OTR of a film of thickness 12 $\mu$m | <30 | <25 | <20 | $cm^3/(m^2 \cdot bar \cdot d)$ | DIN 53 380, Part 3 |
| Adhesion between the layers (B and D) | >0.5 | >1.0 | >1.5 | N/25 mm | as described |
| Planar orientation $\Delta p$ | <0.162 | <0.160 | <0.158 |  | as described |
| Thickness of the film | 6 to 300 | 8 to 200 | 10 to 100 | $\mu$m |  |
| Opacity of the film | <20 | <15 | <10 | % | ASTM-D 1003-52 |

Test Methods

To characterize the raw material and the films, the following methods were used: DIN=Deutsches Institut fur Normung (German Institute for Standardization) ASTM=American Society for Testing and Materials (1) Oxygen Transmission Rate (OTR)

The oxygen barrier was measured using an OXTRAN® 100 from Mocon Modern Controls (USA) in accordance with DIN 53 380, Part 3 (23° C., 50% relative atmospheric humidity on both sides of the film. The OTR was measured in each case on film of thickness 12 $\mu$m.

(2) Opacity

The determination of the opacity of the film was based on ASTM-D 1003-52.

(3) SV Value (Standard Viscosity)

The standard viscosity, SV (DCA), is measured in dichloroacetic acid, based on DIN 53 726. The intrinsic viscosity (IV) is calculated as follows from the standard viscosity:

$$IV(DCA) = 6.907 \cdot 10^{-4} SV(DCA) + 0.063096$$

(4) Gloss

The gloss was determined to DIN 67530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light rays incident on the photoelectronic detector are displayed as a proportional electrical quantity. The measurement is dimensionless and has to be quoted together with the angle of incidence. The measurements for the gloss reported in the examples were measured at an angle of incidence of 20°.

(5) Roughness

The roughness $R_a$ of the film was determined to DIN 4768 at a cutoff of 0.25 mm. Measurement was effected not on a glass plate but rather in a ring. In the ring method, the film is clamped into a ring, so that neither of the two surfaces touches a third surface (for example glass).

(6) Planar Orientation Δp

The planar orientation is determined via the measurement of the refractive indices with an Abbe refractometer (Kruss Optronic, Germany). The planar orientation is always measured on the glossier side of the film. The determination of the refractive indices has already been reproduced in detail, for example, in EP-A-0 952 176, page 10. Therefore, reference is made explicitly to this document. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_Z)/3$$

(7) Adhesion Between the Layers

Before adhesive bonding, the film specimen (300 mm long×180 mm wide) of the present invention is placed on smooth paperboard (200 mm long×180 mm wide; approx. 400 g/m², bleached, outer layers coated); the projecting film ends are folded back onto the reverse side and secured with adhesive tape.

The film of the present invention is adhesively bonded using a standard polyester film of thickness 12 μm (e.g. Melinex® 800) with a doctor unit and doctor bar no. 3 from Erichsen (Germany), by applying approx. 1.5 ml of adhesive (Novacote® NC 275+CA 12; mixing ratio: 4/1 +7 parts of ethyl acetate) to the barrier layer (D) of the film of the present invention. After the solvent has been removed by aeration, the standard polyester film is laminated onto the barrier layer (D) of the film of the present invention using a metal roll (width 200 mm, diameter 90 mm, mass 10 kg, to DIN EN 20 535). The parameters of lamination are:

| | |
|---|---|
| Amount of adhesive: | 5 +/− 1 g/m² |
| Aeration after application of the adhesive: | 4 min +/− 15 s |
| Doctor thickness (Erichsen): | 3 |
| Speed level of the doctor: | approx 133 mm/s |
| Curing time of the bond: | 2 h at 70° C. in a forced-air oven |

A 25+/−1 mm strip cutter is used to take specimens of length about 100 mm. In this context approx. 50 mm of adhesive bond and 50 mm of unbonded individual layers are required to secure/clamp the test specimen. The test specimens are secured by means of double-sided adhesive tape by the reverse side of the film of the present invention (base layer B or overlayer C), over the full surface, to a metal support plate. The plate with the adhesively bonded composite is clamped into the lower clamping jaw of the tensile testing machine. The clamp separation is 100 mm. The unlaminated end of the standard polyester film is clamped into the upper clamping jaw of the tensile testing machine (for example Instron®, Zwick) in such a way that there is a peeling angle of 180° C. The average peeling force in N/25 mm is reported, rounded to one decimal place.

| | |
|---|---|
| Sample width: | 25 mm |
| Initial force: | 0.1 N |
| Measurement length: | 25 mm |
| Separation rate up to initial force: | 25 mm/min |
| Initial distance: | 5 mm |
| Test distance: | 40 mm |
| Sensitivity: | 0.01 N |
| Separation rate: | 100 mm/min |

The measurement for the peeling force is equivalent to the minimum adhesive force between the layers of the film according to the invention, since the adhesive force between the adhesive and the standard film is distinctly greater.

EXAMPLES

The examples which follow illustrate the invention. The products used (brands and manufacturer) are each specified only once and then also relate to the examples which follow.

Example 1

Chips of polyethylene terephthalate (prepared by the transesterification process using Mn as the transesterification catalyst, Mn concentration in the polymer: 100 ppm; dried at a temperature of 150° C. to a residual moisture content of below 100 ppm) and poly(m-xyleneadipamide) (MXD6) likewise dried at a temperature of 150° C. were fed in a mixing ratio of 85:15 to the extruder (single-screw extruder, for the base layer (B). Extrusion was then initially used to produce a single-layer film. The film was stretched in longitudinal direction and then coated with the barrier layer (D) according to the invention (by means of reverse gravure). Subsequently, the two-layer film was stretched in transverse direction, and a transparent, two-layer film having DB structure and a total thickness of 12 μm was obtained.

Barrier Coating (D) Applied to Base Layer (B):
7% by weight of PMA-co-PA having an average molecular weight of 3000 from Sigma-Aldrich, Milwaukee, Wis., USA (product name: 41605-3)
3% by weight of polyvinyl alcohol from Celanese Ltd., USA (product name: CELVOL® 305, $M_w$=31 000 to 50 000)

Base Layer (B):
85.0% by weight of polyethylene terephthalate 4023 from KoSa, Germany, having an SV value of 800
15% by weight of poly(m-xyleneadipamide) (MXD6) from Mitsubishi Gas Chemical Co., product name NYLON® MXD6, 6001 having a melt viscosity of 1400 poises The production conditions in the individual process steps were:

| | | | |
|---|---|---|---|
| Extrusion | Temperatures | B layer: | 290° C. |
| | Temperature of the takeoff roll | | 25° C. |

-continued

| Longitudinal stretching: | Stretching temperature: | 125° C. |
| | Longitudinal stretching ratio: | 4.0 |
| Transverse stretching: | Stretching temperature: | 130° C. |
| | Transverse stretching ratio | 3.9 |
| Setting: | Temperature: | 230° C. |
| | Time: | 3 s |

The surface of the base layer (B) had the required high gloss, and the film had the required low opacity and the required low OTR. In addition, the film could be produced very efficiently, i.e. without tears, and also exhibited the desired processing performance.

Example 2

In comparison to Example 1, coextrusion is now used to produce an initially two-layer film having BC structure. The composition of the base layer (B) was unchanged compared to Example 1. In addition, chips of polyethylene terephthalate and a filler were fed to the extruder (twin-screw extruder) for the overlayer (C). The film was stretched in longitudinal direction and then coated with the barrier layer (D) according to the invention. Subsequently, the three-layer film was stretched in transverse direction to obtain a transparent three-layer film having DBC structure and a total thickness of 12 μm. The thickness of the overlayer (C) was 1.0 μm.

Overlayer (C):
100% by weight of polyester raw material 4023 from KoSa having an SV value of 800, consisting of 99% by weight of polyethylene terephthalate 4023 from KoSa and 1.0% by weight of silica particles (SYLYSIA® 320 from Fuji/Japan) having a $d_{50}$ value of 2.5 μm The production conditions in the individual process steps were similar to those in Example 1. The film had the required low opacity and the required low OTR. In addition, the film could be produced very efficiently, i.e. without tears, and also exhibited the desired processing performance.

Comparative Example CE1

A film was produced in accordance with Example 1 of JP 2001-347562. The roughness values of this film are much too high, and the gloss of the film is not within the inventive range.

The properties and the structure of the films produced according to the examples and the comparative examples are compiled in Table 2.

What is claimed is:

1. A biaxially oriented polyester film which has a base layer (B), at least one side of which has been coated wit a barrier layer (D), wherein the base layer (B) comprises poly(m-xyleneadipamide) and polyester and the barrier layer (D) is composed of a blend in which a film-forming substance and a copolymer of maleic acid and acrylic acid are present, wherein the polyester film has an oxygen transmission (OTR) smaller than 30 $cm^3 \cdot m^{-2} \cdot d^{-1} \cdot bar^{-1}$ and the base layer (B) exhibits a gloss of greater than 100.

2. The polyester film as claimed in claim 1, wherein the base layer (B) comprises from 5 to 30% by weight of poly(m-xyleneadipamide), based on the weight of the base layer (B).

3. The polyester film as claimed in claim 1, wherein the melt viscosity of the poly(m-xyleneadipamide) is smaller than 2000 poises.

4. The polyester film as claimed in claim 1, wherein the polyester of the base layer (B) has at least one of ethylene glycol units and terephthalic acid units, or ethylene glycol units and naphthalene-2,6-dicarboxylic acid units.

5. The polyester film as claimed in claim 1, wherein the polyester of the base layer (B) has isophthalic acid units, terephthalic acid units, and ethylene glycol units.

6. The polyester film as claimed in claim 1, wherein polyethylene terephthalate is used as polyester of the base layer (B).

7. The polyester film as claimed in claim 1, wherein polyvinyl alcohol is used as film-forming substance for the barrier layer (D).

8. The polyester film as claimed in claim 1, which has a D-B-C layer structure, C being an overlayer which may be identical with or different from (D).

9. The polyester film as claimed in claim 8, wherein the overlayer (C) comprises the polyester used for the base layer (B).

10. The polyester film as claimed in claim 1, which has a haze smaller than 20%.

11. The polyester film as claimed in claim 1, wherein the adhesion between the base layer (B) and the barrier layer (D) is greater than 0.5 N/25 mm.

12. A process for producing a polyester film as claimed in claim 1, encompassing the steps of
 a) production of a film by extrusion or coextrusion,
 b) longitudinal stretching of the film,
 c) coating of the film with the barrier layer (D),
 d) transverse stretching of the coated film, and
 e) heat-setting of the stretched film.

13. Packaging film comprising polyester film as claimed in claim 1.

TABLE 2

| Examples | Film thickness μm | Film structure | Thickness of the barrier layer (D) μm | Poly(m-xyleneadipamide) (MXD6) content in base layer (B) % by weight | Poly(m-xyleneadipamide) (MXD6) content in base layer (C) % by weight | Gloss of the surface (B) (20°) | Roughness $R_a$ of the surface (B) μm | Planar orientation Δp | OTR $cm^3$/ $m^2 \cdot$ bar · d | Adhesion between the layers B and D N/25 mm | Opacity of the film % |
|---|---|---|---|---|---|---|---|---|---|---|---|
| Example 1 | 12 | DB | 0.1 | 15 | — | 120 | 60 | 0.157 | 15 | 1 | 8 |
| Example 2 | 12 | DBC | 0.1 | 15 | 0 | 120 | 60 | 0.158 | 15 | 1 | 5 |
| CE1 | 12 | B | | 20 | — | 65 | 170 | | 22 | | 8 |

14. A film according to claim 1, wherein the melt viscosity of the poly(m-xyleneadipamide) is within 30% of the melt viscosity of the polyester.

15. A film according to claim 1, wherein said film further comprises recycle formed from said film, present in an amount of from about 10 to 60% by weight.

16. A biaxially oriented polyester film which has a base layer (B), at least one side of which has been coated with a barrier layer (D), said base layer (B) comprising poly(m-xyleneadipamide) and polyester and said barrier layer (D) comprising a film-forming substance and a copolymer of maleic acid and acrylic acid, wherein the only catalysts associated with the film consist of polymerization catalyst(s).

* * * * *